(12) United States Patent
Albornoz et al.

(10) Patent No.: US 9,842,007 B2
(45) Date of Patent: Dec. 12, 2017

(54) COMPUTING DEVICE, METHOD, AND PROGRAM FOR DISTRIBUTING COMPUTATIONAL LOAD

(71) Applicant: Fujitsu Limited, Kanagawa (JP)

(72) Inventors: Jose Albornoz, Iver Heath (GB); Sven van den Berghe, Marlo Bucks (GB); Peter Chow, Gillingham (GB)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 14/154,555

(22) Filed: Jan. 14, 2014

(65) Prior Publication Data

US 2014/0201758 A1 Jul. 17, 2014

(30) Foreign Application Priority Data

Jan. 14, 2013 (EP) ..................................... 13151211

(51) Int. Cl.
*G06F 9/50* (2006.01)
*G06F 9/46* (2006.01)
*H04L 29/08* (2006.01)

(52) U.S. Cl.
CPC .......... *G06F 9/5083* (2013.01); *G06F 9/5088* (2013.01); *G06F 9/5094* (2013.01); *Y02B 60/142* (2013.01); *Y02B 60/162* (2013.01)

(58) Field of Classification Search
CPC ... H04L 67/10; H04L 67/1002; G06F 9/5055; G06F 9/505; G06F 9/45558; G06F 9/5083; G06F 9/5088; G06F 9/5094; G06F 2209/5022; Y02B 60/142; Y02B 60/162
See application file for complete search history.

(56) References Cited

U.S. PATENT DOCUMENTS

| 8,234,390 | B2 * | 7/2012 | Shanmugham | H04L 65/1073 709/201 |
| 8,775,628 | B2 * | 7/2014 | Francis | H04L 67/1002 709/224 |
| 9,104,497 | B2 * | 8/2015 | Mortazavi | H04L 29/08144 |

(Continued)

OTHER PUBLICATIONS

Mustafee et al., A multi-methodology agent-based approach for container loading, Dec. 2011, 12 pages.*

(Continued)

*Primary Examiner* — Thuy Dao
(74) *Attorney, Agent, or Firm* — Staas & Halsey LLP (57) ABSTRACT

Embodiments of the present invention provide a computing device configured to operate as a particular computing device among a plurality of interconnected computing devices, comprising: a load information obtaining unit configured to obtain, from the particular computing device and from the or each of a group of one or more other computing devices from among the plurality of interconnected computing devices, load information representing the current computational load of the computing device from which the information is obtained; and a load redistribution determination unit configured, in dependence upon the obtained load information, to determine whether or not to redistribute computational load among the particular computing device and the group, and if it is determined to redistribute computational load, to determine the redistribution and to instruct the determined redistribution.

9 Claims, 7 Drawing Sheets

(56) References Cited

U.S. PATENT DOCUMENTS

| | | | |
|---|---|---|---|
| 9,270,639 B2* | 2/2016 | Lopez | H04L 63/0218 |
| 2008/0104587 A1 | 5/2008 | Magenheimer et al. | |
| 2010/0125847 A1* | 5/2010 | Hayashi | G06F 9/505 |
| | | | 718/102 |
| 2010/0251258 A1* | 9/2010 | Hanamori | G06F 9/5088 |
| | | | 718/105 |
| 2011/0106935 A1* | 5/2011 | Srinivasan | G06F 1/3209 |
| | | | 709/224 |
| 2012/0066684 A1* | 3/2012 | Takami | 718/102 |
| 2012/0204051 A1 | 8/2012 | Murakami et al. | |
| 2013/0227145 A1* | 8/2013 | Wright | G06F 9/5083 |
| | | | 709/226 |

OTHER PUBLICATIONS

De Grande et al., Predictive Dynamic Load Balancing for Large-Scale HLA-based Simulations, Sep. 2011, 8 pages.*

European Search Report dated Oct. 15, 2013 in corresponding European Application No. 13151211.3-1954.

Moreno Marzolla et al., Server Consolidation in Clouds Through Gossiping, World of Wireless, Mobile and Multimedia Networks (WOWMOM), IEEE, Jun. 20, 2011, pp. 1-6.

Eugen Feller et al, "A Case for Fully Decentralized Dynamic VM Consolidation in Clouds", Cloud Computing Technology and Science (CLOUDCOM), 2012 IEEE $4^{TH}$ International Conference, Dec. 3, 2012, pp. 26-33.

SPECpower_ssj208 Quickstart Guide v. 1.12, 2008.

\* cited by examiner

COMPUTING DEVICE, METHOD, AND PROGRAM FOR DISTRIBUTING COMPUTATIONAL LOAD

CROSS-REFERENCE TO RELATED APPLICATIONS

This application claims the benefit of European Application No. 13151211.3, filed Jan. 14, 2013, the disclosure of which is incorporated herein by reference.

BACKGROUND OF THE INVENTION

1. Field of the Invention

This invention lies in the technical field of computational load distribution in networked computing environments. In particular, the invention lies in the field of green data centre technology, and energy-efficient data centre load distribution.

2. Description of the Related Art

Given their enormous electrical power consumption and associated carbon footprint, computing environments such as data centre's are natural targets for techniques aimed at improving their energy efficiency and reducing their impact on the environment. This is especially true in light of the explosive growth in the number of data centre's and the increasing dependence of our society on the information technology and computing services provided by them. Besides, energy costs are a major fraction of the operating costs of data centre's, becoming almost as important as the cost of the facilities and equipment.

Data centre's use some energy to power the IT equipment; computers, storage and networking equipment. The operation of this equipment produces heat (roughly equivalent to the amount of power provided to the IT equipment as there is no other way to dissipate the used energy) so another major use of data centre power is to remove this heat from the data centre equipment and halls and to expel it to the outside (by using, for example, air conditioners).

Existing data centre's are provided with global/centralized controllers which gather information from the devices in the data centre, and allocate and redistribute tasks among the individual devices in order to pursue a particular policy goal, such as energy efficient operation. Complex algorithms exist for calculating and realizing optimum distribution of computational load among devices and correct operating settings of cooling equipment.

As the size of data centre's grows, and their increasing importance in IT infrastructure provision increases, the complexity of the algorithms executed by the global/centralized controllers in order to meet energy efficiency targets also increases.

SUMMARY OF THE INVENTION

Embodiments of the present invention include a computing device configured to operate as a particular computing device among a plurality of interconnected computing devices, comprising:

a load information obtaining unit configured to obtain, from the particular computing device and from the or each of a group of one or more other computing devices from among the plurality of interconnected computing devices, load information representing the current computational load of the computing device from which the information is obtained; and a load redistribution determination unit configured, in dependence upon the obtained load information, to determine whether or not to redistribute computational load among the particular computing device and the group, and if it is determined to redistribute computational load, to determine the redistribution and to instruct the determined redistribution.

Advantageously, embodiments of the present invention provide a mechanism for peers in a system of interconnected computing devices to determine and instruct load redistribution among themselves based on local information without the need for a centralized controller function or apparatus. Therefore, the system and redistribution mechanism become scalable without the limitations of a bottleneck at a centralized controller.

The precise algorithm executed by the load transfer determination unit in determining whether or not to instruct a load distribution, and what load redistribution to instruct, will depend upon the details of the implementation of the embodiment. Advantageously, algorithms may be selected which lead to a more efficient operation of the plurality of interconnected computing devices, or which fulfill certain quality of service requirements.

For example, it may be that the load redistribution determination unit is configured to determine redistribution of loads as one or more transfers from a donor computing device from among the particular computing device and the group of computing devices, to a recipient computing device from among the particular computing device and the group of computing devices, wherein in each transfer, the current computational load of the donor computing device is less than the current computational load of the respective recipient computing device (based on the load information). Algorithms designed to meet that requirement will tend the computing devices concerned toward having fewer computing devices with more load, rather than an even distribution. Such a distribution is advantageous because it allows certain computing devices to enter a hibernation, standby, sleep, or some other form of power saving mode, or to be turned off. The overall efficiency of the plurality of interconnected computing devices therefore improves.

The load information obtaining unit and the load redistribution determination unit may be provided as hardware or may be software modules running on the particular computing device. Such software modules, when executed, cause the computing device to become, or to function as, the load information obtaining unit and the load redistribution determination unit.

Obtaining the load information from the particular computing device itself may include sending a request to another software or hardware module operating on or as part of the same computing device, and receiving a report or some other form of response including load information. Obtaining the load information from computing devices in the group of computing devices may include sending a load information request to the computing devices and receiving a report or some other form of response including load information. In some computing devices computational load is assumed to be proportional to power consumption, and hence current computational load is derivable from an indication of power consumption rates. Therefore, the load information may include, or be provided in the form of, an indication of power consumption rates. The SPECpower_ssj2008 benchmark provides a load-power characterization which can be utilized by the load information obtaining unit in invention embodiments to derive computational load from an indication of power consumption rates. Alternatively, the computing devices from which the load information is obtained may themselves utilize a load-power characterization such as the SPECpower_ssj2008 benchmark to determine their own current computational load to report to the particular computing device.

For the sake of consistency of use of language, in this document we shall take the maximum computational load that a computing device can handle to be the "maximum capacity" of that device, and the computational load being handled at a point in time to be the "current computational load", wherein the point in time is the time of generating the report or response to the request for load information. The "current capacity" of a computing device is the difference between the maximum capacity and the current computational load. The current capacity may also be referred to as "the current capacity to perform computational load additional to current computational load".

Current computational load may be obtained as a proportion of maximum capacity of the computing device from which the load information is obtained, or may be provided as an absolute value of computational load (whether it is an indication of power consumption, or any other form of information). The load information obtaining unit itself may be aware of the maximum capacity of the or each computing device in the group, so that an indication of one of current capacity or current computational load enables the other to be calculated/obtained. Alternatively, the load information may include two of the following, which allow the third to be calculated: maximum capacity, current capacity, current computational load.

It may be that the redistribution of computational load is a plurality of transfers of computational load from donor computing devices to recipient computing devices from among the particular computing device and the group of computing devices. Alternatively, it may be that the redistribution of computational load is a single transfer of computational load from a donor computing device to a recipient computing device. Furthermore, embodiments may be configured so that the donor is always the particular computing device, that is to say, the redistribution is of computational load from the particular computing device to one of the group of computing devices.

Advantageously, such embodiments simplify the function of the load redistribution determination unit by reducing the number of degrees of freedom in the redistribution. The determination is thus quicker and requires less processing capacity. Furthermore, the design of the algorithm is simplified, since results are predictable, that is to say, computational load is pushed away from the computing device on which the computational load obtaining unit and load redistribution determination unit (hereinafter "the units") function.

Evidently, embodiments of the present invention are adaptable in terms of the redistribution policy that is pursued, and the algorithm or logical process followed by the load redistribution determination unit will depend on the desired overall distribution of computational load among the plurality of interconnected computing devices. For example, it may be that the load redistribution determination unit instructs transfers of computational load which even out the computational load among the particular computing device and the group so that they all have approximately even levels of computational load. Of course, the algorithm executed by the load redistribution determination unit may depend on the information included in the load information. As an example of an algorithm in embodiments wherein the obtained load information from the group of computing devices includes capacity information representing the current capacity of the computing device from which the load information is obtained to perform computational load additional to its current computational load, the load redistribution determination unit is configured to determine, based on the obtained load information, the computing device having the smallest capacity from among the computing devices of the group that have a non-zero current capacity, and to select the determined computing device as a recipient computing device of the redistribution.

Advantageously, an algorithm based upon the above principle will ensure that the computational load of the particular computing device is used to increase the computational load of a computing device in the group, and often to fully load that computing device from the group. Therefore, the total computational load in the plurality of interconnected computing devices tends toward being loaded upon fewer computing devices, enabling unloaded computing devices to be switched off and hence to ease power consumption. This is particularly effective in embodiments in which a plurality of computing devices are configured to operate as the particular computing device and execute the load information obtaining unit and load redistribution determination unit software modules, or to have load information obtaining unit and load redistribution determination units. For example, such a plurality of computing devices may be configured to perform the load information obtaining function (that is, the functionality of the load information obtaining unit) and the load redistribution determining function (that is, the functionality of the load redistribution determining unit) in turn.

In addition to selecting a recipient computing device to which to transfer the computational load of the particular device, the load redistribution determination unit may also determine the amount of computational load to transfer. It may be that there is some granularity in the size of tasks that can be transferred, and that is why amounts selected may be referred to as being approximate, i.e., approximate is taken to mean equal allowing for granularity. The allowance for granularity may depend on the nature of the load transfer. For example, the particular computing device is to transfer an amount of computational load determined by the current capacity of the recipient computing device in order to increase the load of the recipient computing device up to its maximum capacity, then it may be that the amount of load transferred cannot exceed the current capacity (in order to avoid overloading the recipient computing device). In such situations, approximately "equal to" may be taken to mean "as close to as possible without exceeding". As an exemplary algorithm or logical process for selecting an amount of computational load to transfer, the load redistribution determination unit is configured to select an amount of computational load to redistribute in the instructed redistribution, the selected amount being (approximately) equal to the current computational load of the particular computing device, unless the current capacity of the recipient computing device is less than the current computational load of the particular computing device, in which case the selected amount is (approximately) equal to the current capacity of the recipient computing device. That is to say, the selected amount is approximately equal to the smaller of the current computational load of the particular computing device and the current capacity of the recipient computing device, and if the two quantities are equal then the selected amount is the current computational load of the particular computing device. Alternatively, it may be that if the two are equal it is determined not to perform a load transfer.

Thus, embodiments which redistribute an amount of computational load selected in a manner such as that described above, from a computing device functioning as the particular computing device, to a recipient computing device selected in a manner such as that set out above, define an energy-efficient, easily scalable algorithm for load migration. Embodiments use only local information, so the need for a centralized control mechanism for load distribution is avoided. Furthermore, the simplicity of the algorithm and the small bandwidth required allows for a small execution time; therefore the necessary VM migration (load transfers) could take place at a timescale which is much shorter than the rate at which incoming service requests (new computational load) arrive.

Advantageously, savings in power consumption can be made achieved in embodiments of the present invention by pursuing a load redistribution policy which reduces either or both of power consumption of the plurality of interconnected computing devices themselves, or power consumption of a cooling system. The cooling system being configured to remove heat from the plurality of interconnected computing devices and/or an enclosure in which they are housed. In certain embodiments, it may be that further power consumption savings can be achieved by powering down or hibernating computing devices which are not currently handling any computational load. The computing device or computing devices embodying the present invention may be configured so that if the load redistribution determination unit instructs the particular computing device to redistribute all of its current computational load, the particular computing device is configured, following completion of the instructed redistribution, to enter a sleep, hibernation, or standby mode or to switch off. By switching off or hibernating unused computing devices, significant savings in power consumption are achieved.

The computing devices may be configured to self-organize into groups. For example, the group may be selected by the load information obtaining unit and defined by the issuance of a request for load information from the load information obtaining unit. Alternatively, membership of a group for a particular computing device may be more long-term, and once another computing device has been notified that it is in the group for a particular computing device, the another computing device is configured to report its load information to the particular computing device, for example, on a periodical basis.

The group of computing devices among which load redistribution with the particular computing device takes place could be any selection of computing devices from among the plurality of interconnected computing devices. However, further power consumption savings can be made if the group is selected in dependence upon physical proximity to the particular computing device, and there is a logical progression of computing devices taking their turn to function as the particular computing device (which logical progression also follows some geographical progression). Such embodiments enable computational load to effectively be pushed in a particular physical direction. It may take more than one iteration of the plurality of interconnected computing devices taking a turn to function as the particular computing device to achieve that effect. The membership of the group of other computing devices from which load information is obtained by a particular device and hence which, in certain embodiments, define a pool from which a recipient for computational load from the particular computing device is selected. The membership of the group for a particular computing device may be related to the physical placement of computing devices relative to the particular computing device. There are many ways in which that relation may be implemented in practice, for example, the group may be formed of:

computing devices within a predetermined maximum physical distance to the particular computing device; and/or computing devices physically adjacent to the particular computing device in one or more directions; and/or computing devices housed within a rack which also houses the particular computing device.

It may be that the plurality of interconnected computing devices have addresses or coordinates (which may be dependent or independent of physical location) which define an n-dimensional topology. Such coordinates or addresses may be used as a simple and consistent mechanism for self-organizing into groups. For example, each of the plurality of interconnected computing devices has a designated position in the or each of n dimensions, and for each computing device, the group is formed of the computing devices designated with the adjacent positions in the or each of the n dimensions. The dimensions in that sense may be notional dimensions, defined only by the arbitrary allocation of coordinates (designated positions) to computing devices, or may represent the physical location of the computing device among the plurality of interconnected computing devices.

In examples in which the dimensions represent the physical location of the computing device among the plurality of computing devices, it may be that n is equal to 2 or 3, each of the n dimensions corresponds to a spatial dimension, and the designated position of each computing device in the n dimensions represents the spatial position of the computing device relative to the other computing devices. Of course, in such embodiments, the n spatial dimensions may be orthogonal (or mutually orthogonal, as the case may be).

The computing devices may be any apparatus configured to handle computational load such as processing tasks. The computing devices may be a network of computers forming a facility to provide infrastructure as a service accessible by remote clients, for example, a data centre. The data centre may be a virtualized data centre, in which the energy required for operation can be reduced by appropriately migrating virtual machines or virtual resources to computing devices located in particular physical areas. Each computing device may comprise a plurality of components (including any combination of the following, among others: storage unit, memory, one or more CPUs, I/O components, sensors, power supply units, fans), which plurality of components may be housed within a case. Embodiments of the present invention are particularly advantageous in implementations in which power consumption is particularly high, for example, it may be that the plurality of interconnected computing devices are servers and are housed within an enclosure. Thus, there are significant power consumption savings to be made both in terms of power consumed by the processors in handling or performing the computational load, and power consumed by apparatus at the enclosure as a facility, such as cooling apparatus. As a further example, the enclosure may be a data centre, wherein the computational load at a computing device is formed of (or includes) virtual servers, so that a transfer of computational load includes migrating one or more virtual servers from one computing device to another.

Embodiments of the present invention are particularly effective in an environment in which a plurality of computing devices are configured to perform the load information obtaining function and load redistribution determination function in turn. The beneficial impact of performing said functions on a single computing device among a plurality of interconnected computing devices can increase exponentially if the plurality of interconnected computing devices (or at least more than one among them) perform said functions in sequence. Embodiments of the present invention include a plurality of computing devices as defined above and elsewhere in this document (and particularly as defined by the claims), the plurality of computing devices being the plurality of interconnected computing devices, wherein the plurality of interconnected computing devices are each configured, in turn, to operate as the particular computing device. Such embodiments provide networked computing environments which can be operated and cooled in an energy efficient manner by implementing an algorithm (via the load information obtaining unit and load redistribution determination unit) which enforce parsimonious use of IT infrastructure and cooling resources.

Furthermore, in such embodiments, the order in which the plurality of interconnected computing devices operate as the particular computing device may be determined by the physical location of the computing devices. The order being determined by the physical location of the devices may include progressing sequentially along a certain spatial direction, with the order of computing devices that are co-located in the certain spatial direction being determined by progressing along those computing devices in another spatial direction, and so on. Advantageously, in embodiments such as those in which the plurality of interconnected computing devices are housed within an enclosure, certain algorithms performed by the particular computing device have the effect of displacing/pushing computational load, so that computational load tends to be physically located toward a particular direction. Consequently, heat generated by computing devices in the enclosure tends to be localized and can be removed more efficiently by a cooling system. In other words, computational loads are automatically concentrated in a particular zone of the enclosure or data centre.

Furthermore, the control system of a cooling system operable to remove heat from the computing devices and/or the enclosure in which they are housed may be configured to obtain information representing the spatial distribution of computational load from the plurality of computing devices. Such information may be, for example, a report from each computing device of the computational load along with information enabling the cooling system to place determine the location of the computing device within the enclosure (for example, an ID of the computing device if the cooling system has a map, or location coordinates if the cooling system does not store a map). Embodiments of the present invention may include a plurality of interconnected computing devices each configured to operate as the particular computing device defined and described elsewhere in this document, along with one or more air conditioning units, a cooling system, and a controller configured to control operation of the air conditioning units, cooling system, wherein the plurality of computing devices are configured to transmit information representing the spatial distribution of the computational load to the controller. In particular, the cooling system may include one or more CRAC or air conditioning units, ducts, louvers, and valves, and may include devices enabling water cooling in addition to air cooling. Advantageously, the information describing the spatial distribution of computational load (and consequently, the spatial distribution of the power distributed by the cooling devices) can in turn be used to control the operation of the cooling system so that cooling resources (e.g. amount of cool air) are efficiently allocated, therefore yielding additional power savings.

Embodiments of another aspect of the present invention provide a method in a computing device configured to operate as a particular computing device among a plurality of interconnected computing devices, the method comprising:

obtaining, from the particular computing device and from the or each of a group of one or more other computing devices from among the plurality of interconnected computing devices, load information representing the current computational load of the computing device from which the information is obtained; and determining, in dependence upon the obtained information, a redistribution of computational load among the particular computational device and the group; and instructing the determined redistribution.

Embodiments of another aspect of the present invention provide a computer program which, when executed by a computing device, causes the computing device to operate as a computing device embodying the present invention, or to perform a method embodying the present invention.

Embodiments of another aspect of the present invention provide a suite of computer programs which, when executed by a plurality of interconnected computing devices, cause the plurality of interconnected computing devices to operate as a plurality of computing devices embodying the present invention.

Embodiments of another aspect of the invention include software which, when executed by a computer or a distributed network of computers, causes the computer or the distributed network of computers to become (or to function as) a data storage system embodying the invention. The distributed network of computers may include one or more storage units, which may also be distributed. The software may be a computer program or a suite of computer programs, which may be provided on a non-transitory storage medium.

Although the aspects (software/methods/apparatuses) are discussed separately, it should be understood that features and consequences thereof discussed in relation to one aspect are equally applicable to the other aspects. Therefore, where a method feature is discussed, it is taken for granted that the apparatus embodiments include a unit or apparatus configured to perform that feature or provide appropriate functionality, and that programs are configured to cause a computing apparatus on which they are being executed to perform said method feature.

In any of the above aspects, the various features may be implemented in hardware, or as software modules running on one or more processors. Features of one aspect may be applied to any of the other aspects.

BRIEF DESCRIPTION OF THE DRAWINGS

Preferred features of the present invention will now be described, purely by way of example, with reference to the accompanying drawings, in which.

DETAILED DESCRIPTION OF THE PREFERRED EMBODIMENTS

Figure 1:
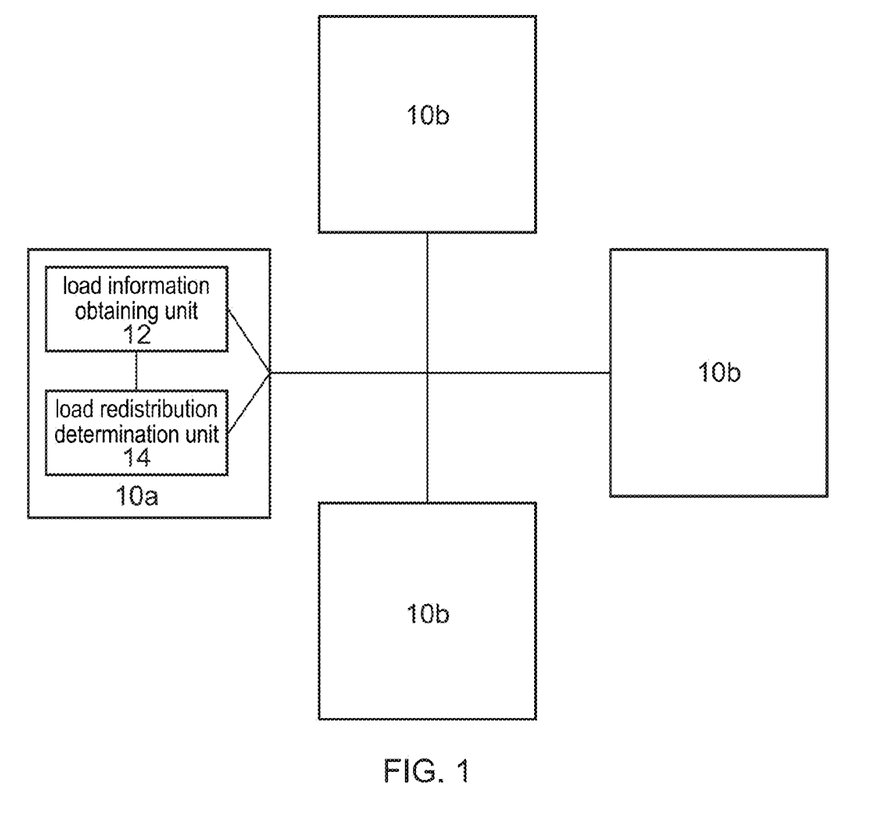
FIG. 1 is a schematic illustration of a computing device embodying the present invention.

FIG. 1 is a schematic diagram of a computing device embodying the present invention. A plurality of computing devices 10a-b, are illustrated, along with interconnections between them. Computing device 10a is configured to operate as a particular computing device among the plurality of computing devices 10a-b and comprises a load information obtaining unit 12 and a load redistribution determination unit 14. The lines running between the computing devices 10a-b represent interconnections over which information including load information and computational load is exchanged. The topology of the interconnections merely indicates that each computing device is configured to exchange information with each of the other computing devices. However, such exchanges of information may be via other of the computing devices rather than direct from one computing device to another.

At the instance represented by the schematic diagram in FIG. 1, the computing device on the left hand side is operating as the particular computing device 10a and hence comprises a load information obtaining unit 12 and load redistribution determination unit 14. However, the status may be temporary, and in certain embodiments, said units may be provided as software modules which are only considered to exist whilst active, so that when another computing device 10b takes a turn as the particular computing device, the another computing device 10b comprises the load information obtaining unit 12 and load redistribution determination unit 14, and the previous particular computing device does not. Of course, the hardware components which contribute functionality to said units, if required, remain on a computing device regardless of whether or not that computing device currently has the status of particular computing device.

The load information obtaining unit is configured to obtain, from the particular computing device 10a itself, and from a group of other computing devices 10b, load information representing the current computational load of the computing device from which the load information is obtained. In the example of FIG. 1, all of the other computing devices 10b in the plurality of interconnected computing devices 10a-b are taken to be members of the group. However, in reality, as few as one of the other computing devices 10b could compose the group.

The load information obtaining unit 12 may be configured to prompt the group of computing devices 10b to send load information. Similarly, the load information obtaining unit 12 may be configured to prompt a sensor or some other software or hardware component of the particular computing device 10a itself to send load information. Alternatively, the group of computing devices 10b and the particular computing device 10a itself may be configured to send load information to the load information obtaining unit 12 either periodically, or when a change of a predetermined magnitude in the computational load occurs in the computing device from which the load information is obtained, or both.

The diagonal line joining the load information obtaining unit 12 to the interconnects represents the flow of load information over the network into the load information obtaining unit.

The load information may include proportional and/or absolute quantitative indications of one or more of the following operating parameters, or sufficient information to allow the following operating parameters to be calculated at the load information obtaining unit 12:

maximum capacity of the computing device from which the load information is obtained;

current computational load of the computing device from which the load information is obtained;

current capacity of the computing device from which the load information is obtained.

The load information obtaining unit 12 transfers the obtained load information, or data representing or based on the obtained load information, to the load redistribution determination unit 14, which is configured to transform the data received from the load information obtaining unit 12 into a decision as to whether or not to instruct load redistribution among the particular computing device and the group of computing devices, and if it is decided to redistribute, instructions for redistribution of computational load among the particular computing device 10a and the group of other computing devices 10b. The line between the load information obtaining unit 12 and the load redistribution determination unit 14 represents the transfer of data from one to the other.

The load redistribution determination unit 14 is configured, in dependence upon the data received from the load information obtaining unit 12, to determine whether or not to redistribute computational load among the particular computing device and the group, and if it is determined to redistribute computational load, to determine the redistribution and to instruct the determined redistribution. The diagonal line joining the load redistribution determination unit 14 to the interconnects represents the transfer of instructions from the load redistribution determination unit 14 to computing devices 10b in the group.

The redistribution of computational load is at least one transfer of computational load from a donor computing device to a recipient computing device from among the particular computing device 10a itself and the computing devices of the group 10b. The load redistribution determination unit 14 is configured to determine a transfer or transfers to instruct in dependence upon the data received from the load information obtaining unit 12, and in accordance with a load redistribution policy. The load redistribution determination unit 14 executes an algorithm to determine whether to instruct transfers and which transfer(s) to instruct, and the algorithm implements a load redistribution policy. The load redistribution policy may be considered to be the distribution of load which the algorithm aims to achieve, or the distribution of load which repetitions of the algorithm tend toward. Examples of policies include an even distribution of computational load among the computing devices; loading fewer computational devices to their maximum capacity and leaving other computational devices with no computational load so that they can be switched off; aiming to achieve a particular computational load in particular computing devices, for example, aiming to load devices at their sweet spot (the computational load at which the ratio of computational load handled to power consumption is at a peak) or not at all, so that devices tend to either operate at their sweet spot or be switched off. Furthermore, the policies may have some spatial aspect, so that the algorithms tend to push computational load in a particular direction—although this may also be influenced by the order in which computing devices from among a plurality of computing devices operate as the particular computing device 10a.

Once the load redistribution determination unit 14 has instructed a redistribution of computational load, the instructed computing devices are configured to perform the redistribution. It may be that only the donor computing device needs to be instructed, which may be the particular computing device 10a itself, so that no instructions are sent via the network. Alternatively, it may be that the recipient computing device also receives an instruction so that it is prepared to receive the additional computational load. The recipient computing device(s) may be configured to inform the computing device designated as the next particular computing device, and the next particular computing device can activate the software or hardware modules forming the load information obtaining unit 12 and load redistribution determination unit 14. The order in which the computing devices amongst the plurality of computing devices operate as the particular computing device may also be dictated by the load redistribution policy and hence implemented via the algorithm.

A detailed description of a data centre implementation of an invention embodiment will now be given. The grid of servers illustrated in FIG. 2 is exemplary of the plurality of interconnected computing devices.

The embodiment is based on a self-organization algorithm that requires only information from neighboring servers, without the need for a centralized control entity. For the sake of simplicity, the plurality of interconnected computing devices in this exemplary embodiment are a number of identical servers 101 deployed in a rectangular grid-like pattern 100 like the one shown in FIG. 2. Straight lines 102 connecting servers represent the fact that each server S(i,j) has load information about the computational loads in its immediate neighborhood composed by servers S(i+1,j), S(i−1,j), S(i,j+1) and S(i,j−1), where "i" and "j" are coordinates along the horizontal and vertical axis respectively, as shown in FIG. 2. Of course, these connections may be representative of hard-wired connections between the servers, or it may be that the servers are connected in some other way, such as via a communications bus, so that the connections are schematic representations of the flow of load information between servers.

This grid topology may be independent of the actual physical topology of the servers within the data centre network. That is to say, the grid in FIG. 2 may be defined by the functionality of certain servers to share load information with certain other servers, rather than being defined by the physical location of the servers within the data centre enclosure. As a particular example, the required information exchange functionality can be provided by low-bandwidth communication links between neighboring servers in the grid, or it can be provided through the existing data centre network infrastructure. In this example, HPC data centre's are particularly beneficial environments within which to implement invention embodiments since communication links between neighboring nodes are already incorporated into the data centre's architecture: since the algorithm of invention embodiments consumes very little bandwidth its impact on the performance of the data centre would be minimal.

Figure 2:
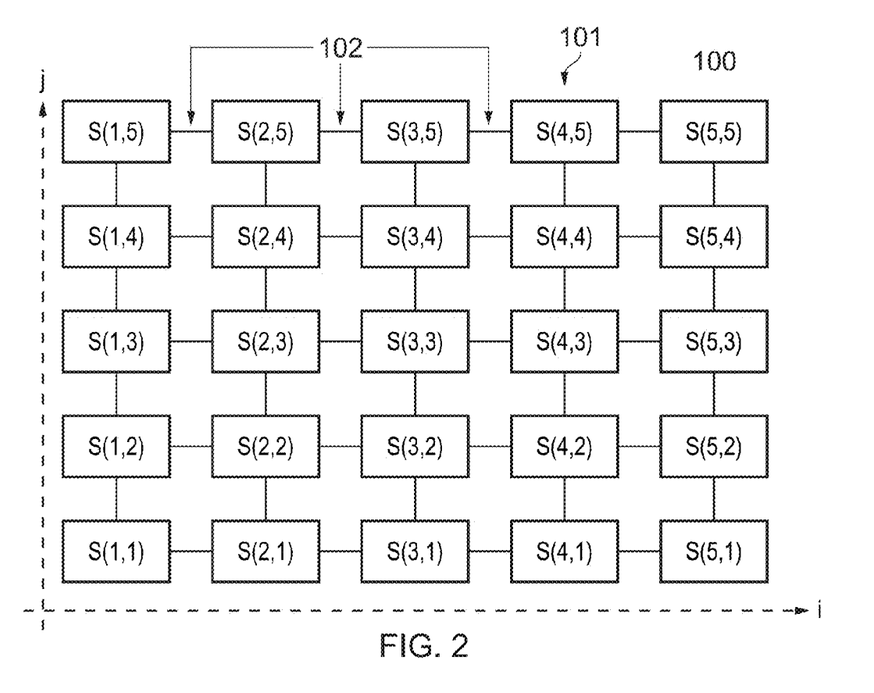
FIG. 2 illustrates an exemplary arrangement of servers in an embodiment of the present invention.

For the purposes of the embodiment of FIG. 2 and the discussion thereof, the position of the servers within the grid shown in FIG. 2 shall be taken to reflect their physical location within a data centre enclosure. Thus, servers in proximity to one another on the grid illustrated in FIG. 2 are also in physical proximity to one another. As a particular example, servers in each column of FIG. 2 could be installed in the same rack: these servers would then have a set of associated cooling resources. The square mesh of FIG. 2 is only one of many topologies which could be employed in invention embodiments: the topology shown is simple and thus easy to implement.

The power consumed by each server S(i,j) is a function of its computational load L(i,j), as described by the SPECpower_ssj2008 (Standard Performance Evaluation Corporation, SPECpower_ssj2008. http://www.spec.org/power_ssj2008/) benchmark or any other similar load-power characterization. The computational load L in a given server S will be denoted by L(S), and it can be quantified using the metric described in SPECpower_ssj2008 or any other suitable metric. The load information reported to a load information obtaining unit at a particular computing device may include a quantitative indication of power consumption, in which case the load information obtaining unit is configured to convert the quantitative indication of power consumption into a quantitative indication of computational load. Alternatively, the computing device from which the load information is obtained may be configured to calculate its own computational load and transmit a quantitative indication of that computational load to the load information obtaining unit.

The embodiment is concerned with the redistribution of computational load. The initial distribution of computational load to servers could take any of a number of forms. For example, loads may be concentrated in particular racks, or may be distributed evenly. A centralized task scheduler may generate tasks (or convert received tasks into a form in which they can be migrated to servers) and migrate them to physical servers as service requests arrive.

Figure 3:
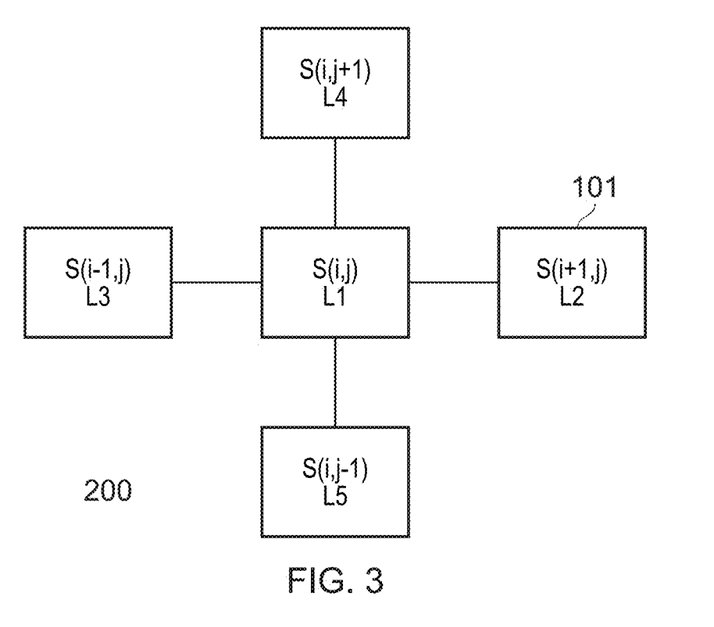
FIG. 3 is a schematic illustration of a neighborhood of servers among which load is redistributed in an invention embodiment.

FIG. 3 is a schematic illustration of the neighborhood 200 considered by the load redistribution determination unit of server S(i,j). The server S(I,j) at the centre of the neighborhood 200 depicted in FIG. 3 is exemplary of the particular computing device. That is to say, when the server S(I,j) is operating as the particular computing device, the group of other computing devices is composed of servers S(i+1,j), S(i−1,j), S(i,j+1) and S(i,j−1). The neighborhood 200 is exemplary of a combination of the particular computing device and the group of other computing devices.

A particular example of an algorithm executed by the load redistribution determination unit in a server operating as the particular computing device, such as S(i,j), shall now be given.

The algorithm (which may be referred to as a load redistribution algorithm or load migration algorithm) is performed by each server in a sequential fashion. Alternatively, the performance of the algorithm by a particular computing device can be considered to be a component of a larger algorithm, so that the larger algorithm visits each server in turn. At a particular server, the algorithm begins by comparing the current computational loads L1, L2, L3, L4 and L5 in the servers belonging to the neighborhood 200 and identifying a server $S_{max}$ such that $L_{max}=L(S_{max})$ is the maximum load in the neighborhood 200 and $L_{max}<100\%$. In other words, $$S_{max}=S|L_{max}=L(S)\geq\{L1,L2,L3,L4,L5\} \text{ and } L_{max}<100$$

The algorithm increases the current computational load of server $S_{max}$ toward a 100% utilization by migrating load from server S(i,j) to server $S_{max}$ as follows:

if the load L1 in server S(i,j) is smaller than the available capacity C=100−$L_{max}$ in server $S_{max}$, load is migrated from S(i,j) to $S_{max}$ until the load in server S(i,j) is zero, and therefore it can be turned off or hibernated;

If the load L1 in server S(i,j) is greater than C, load is migrated from S(i,j) to $S_{max}$ until the load in server $S_{max}$ is 100%.

Figure 4:
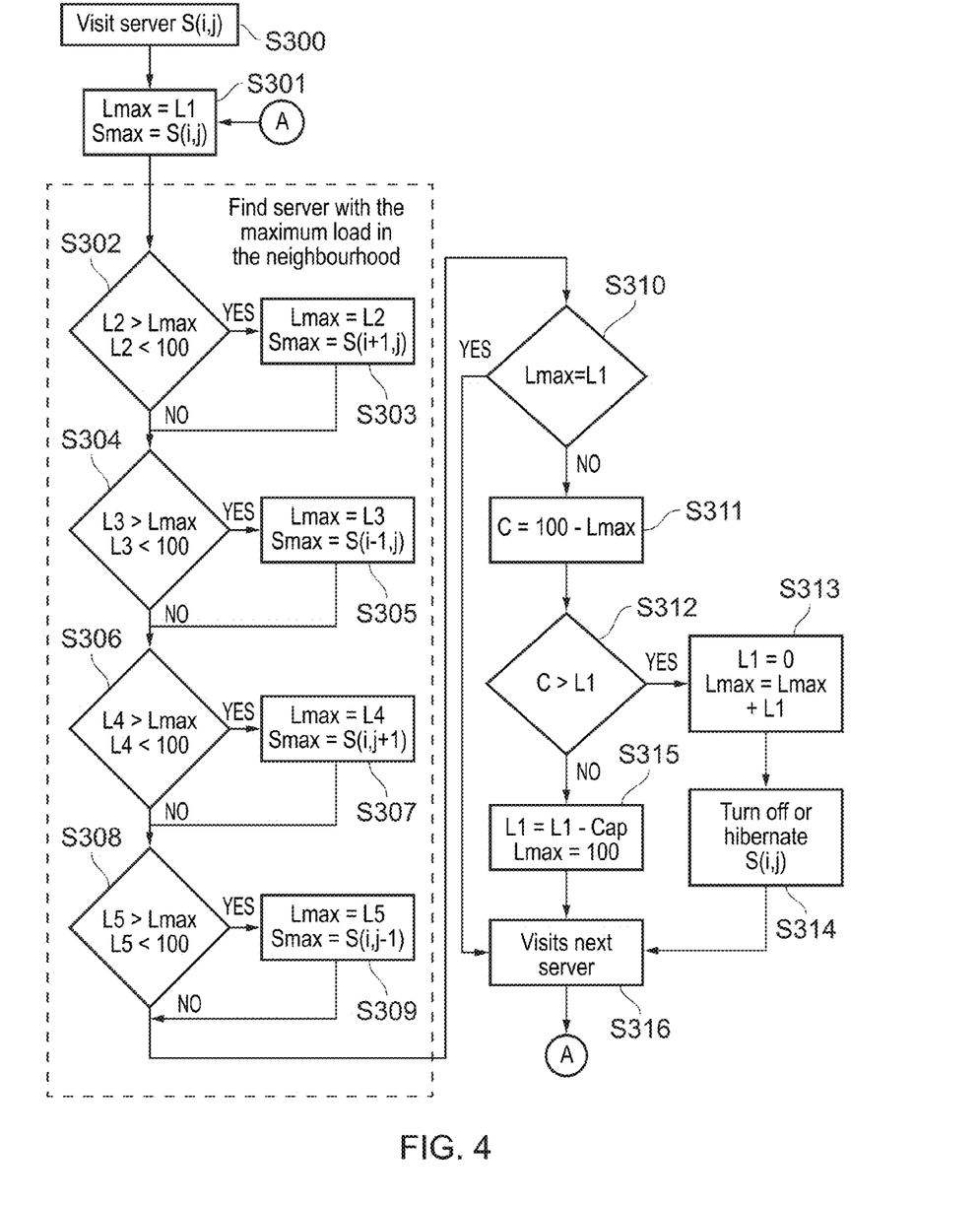
FIG. 4 is a flowchart setting out an exemplary algorithm performed by computing devices embodying the present invention.

FIG. 4 illustrates a flow diagram which sets out an exemplary algorithm such as the algorithm detailed above. At step S300 the algorithm is visiting, or is executed by, a particular server S(i,j) (as an example of a particular computing device). Step S300 represents the initiation of the algorithm at a particular server from among a plurality of interconnected servers. At step S301 the variable $L_{max}$ is assigned the value of load L1, which is the current computational load at the particular server S(i,j). Therefore, the particular server S(i,j) is temporarily identified as $S_{max}$. Steps S302 to S309, illustrated within a dotted box, are to determine which server from among the particular server and the group of other servers (which in this case are the neighboring servers as illustrated in FIG. 3) has the highest current computational load, but is not operating at maximum capacity. It should be noted at this point that an alternative algorithm may function on the basis of identifying the server with the least current capacity from among those servers in the neighborhood which have a non-zero amount of current capacity. For the sake of brevity, such an algorithm shall be referred to as "the alternative algorithm" in the discussion of FIG. 4. At step S302 the load L2 in server S(i+1,j) is compared with the value stored in $L_{max}$: if L2>$L_{max}$ and L2<100 then at step S303 the variable $L_{max}$ is assigned the load L2, and S(i+1,j) is identified as $S_{max}$. This basic procedure is repeated for servers S(i−1,j), S(i,j+1) and S(i,j−1) until step S310 is reached, by which time the server $S_{max}$ and its load $L_{max}$ are correctly identified.

In the alternative algorithm, by the equivalent point, the server with the least current capacity and its current capacity are correctly identified (from among those servers with non-zero current capacity).

At step 310 the load L1 in the particular server S(i,j) is compared to $L_{max}$: if they happen to be the same no further action is taken, and the algorithm moves on to examine the next server at step S316. That is to say, if the load L1 in the particular server S(i,j) is equal to $L_{max}$ then it is determined not to instruct load redistribution, and the algorithm is performed by the next server in the established order.

In the alternative algorithm, if the current capacity in the particular server S(i,j) is equal to the current capacity of the server with the least current capacity (from among those servers with non-zero current capacity) then it is determined not to instruct load redistribution and the algorithm is performed by the next server in the established order.

If this is not the case the flow continues to step S311, at which the capacity C in server $S_{max}$ is calculated as C=100−$L_{max}$ (wherein it is assumed that values of load and capacity are given as percentages). At step S312 this capacity C is compared with the load L1: if the capacity C is greater than the load L1, then the transfer of load L1 to server $S_{max}$ is instructed and performed at step S313; no load is being applied to server S(i,j) anymore, so it is turned off or hibernated at step S314; alternatively, servers could also take advantage of reduced power/performance states to reduce energy consumption. As an exemplary mechanism for carrying out step S314, it could be implemented by using a data centre management system based on the Intelligent Platform Management Interface (IPMI) technology such as the one proposed in European Patent Application 1194408.8 "A data centre thermal and power management system using ACPI/IPMI". If the capacity C is smaller than the load L1 the algorithm continues at step S315, in which a transfer of computational load which is equivalent to the capacity C from server S(i,j) to server $S_{max}$ is instructed and performed. Server $S_{max}$ which will now be utilized at 100% capacity. The flow continues at step S316, where the algorithm moves to the next server in grid 100.

In the alternative algorithm, a comparison is made of the current capacity in the server with the least current capacity and the amount of computational load L1 currently on the particular server S(i,j). If the current capacity in the server with the least current capacity is greater than the amount of computational load currently on the particular server S(i,j), then a transfer of all of the current computational load from server S(i,j) to the server with the least current capacity is instructed and performed. S(i,j) can be turned off or hibernated. On the other hand, if the amount of computational load currently on the particular server S(i,j) is greater than the current capacity in the server with the least current capacity, then a transfer of an amount of computational load equal to the current capacity of the server with the least current capacity from S(i,j) to the server with the least current capacity is instructed and performed. Of course, loading a server beyond 100% should be avoided, so the current capacity of the server with the least current capacity may be treated as a maximum amount of load to transfer, given that there may be some granularity in the loads.

The order in which an algorithm such as the exemplary or alternative algorithms set out above are performed by computing devices among a plurality of interconnected computing devices may be in accordance with coordinates or addresses attributed to the computing devices in a manner which allows an order to be established among the plurality of computing devices. In particular embodiments, the order is based upon the physical location of the computing devices, so that the order runs from one end of an enclosure to another in a first direction, and for computing devices which are co-located in that first direction, another order is established, for example, running from one side of the enclosure to another in a second (orthogonal direction), and likewise for computing devices co-located in both the first and second directions, a further order is established, for example, running from one side of the enclosure to another in a third (mutually orthogonal) direction.

Figure 5:
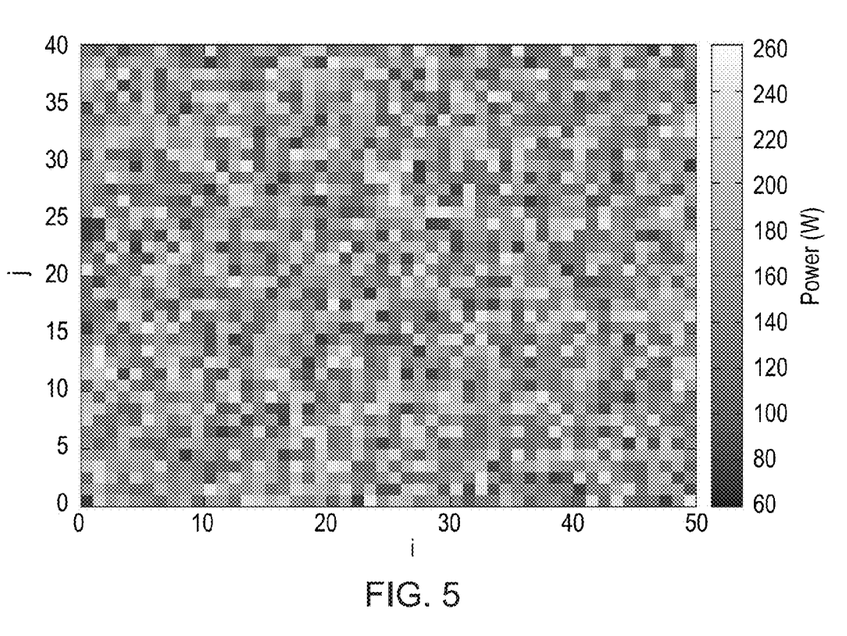
FIGS. 5 and 6 illustrate the results of a simulation of the effect of invention embodiments on load distribution in a grid of servers.
Figure 6:
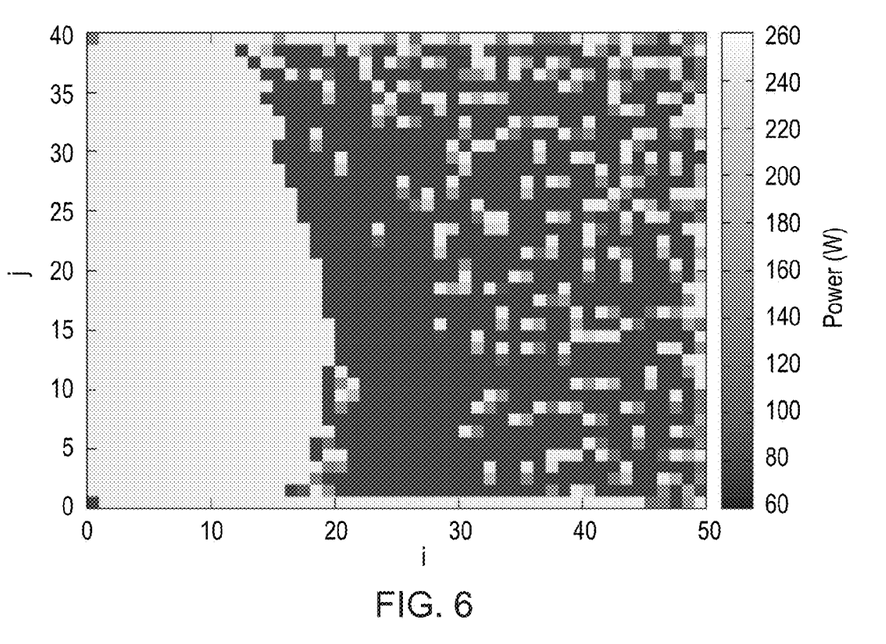

FIGS. 5 and 6 illustrate the results of a simulation executing the exemplary algorithm 50 times through a full set of 2000 servers (each represented by a box in the 40×50 grid of FIG. 5. FIG. 5 depicts a snapshot of the load distribution in a data centre initially: an array of 2000 servers is deployed in a grid of size 40×50: each of the square elements in the figure represents a server with a random load, while the power consumed by each server is represented by the shade of each element as specified by the scale at the right side of the figure. It can be seen that load is randomly distributed so that any two zones of the grid are likely to have a similar ratio of heavily loaded to lightly loaded servers, irrespective of zone location. Furthermore, a given server is equally likely to have any value of load ranging from the minimum to the maximum, there is an even distribution of loads. In this particular example the power consumed by an individual server ranges between 260 W at 100% load and 76 W at zero load, while the total power consumed by the 2000 servers is 321.7 kW for the particular load distribution used in the simulation. The distribution of servers in this grid can be related to their physical distribution in an actual data centre: e.g. the servers in the left hand side of the grid could be located in a group of racks which are concentrated in a certain area of the data floor.

FIG. 6 shows a snapshot of the power distribution in the servers after each server has executed the algorithm 50 times in sequence. It can be observed that there is a concentration of servers operating at full load at the left hand side of the grid. In other words, after performing the algorithm 50 times, load is no longer randomly distributed, a zone on the left hand side of the grid is likely to contain a higher proportion of fully loaded servers than a zone on the right hand side of the grid. This is an indication that the load has migrated towards the left hand side of the grid. In addition, rather than the even distribution loads observed in FIG. 5 before the executions of the algorithm, now, the servers tend to be either fully loaded or empty (turned off), so that the loads are not evenly distributed but concentrated at either end of the spectrum. After powering down unused servers the total power consumption is 253.6 kW, representing a reduction of 21.9%. The power consumption figure can be further reduced in embodiments in which the grid position relates to physical location, since cooling resources can be concentrated in the area where servers are operating at full capacity, a measure that would be especially effective in data centre's with some form of airflow segregation. It must be remarked that this is a dynamic situation: the simplicity of the algorithm allows for a fast execution between incoming service requests, thus enabling the concentration of optimally used servers depicted in FIG. 6.

Figure 7:
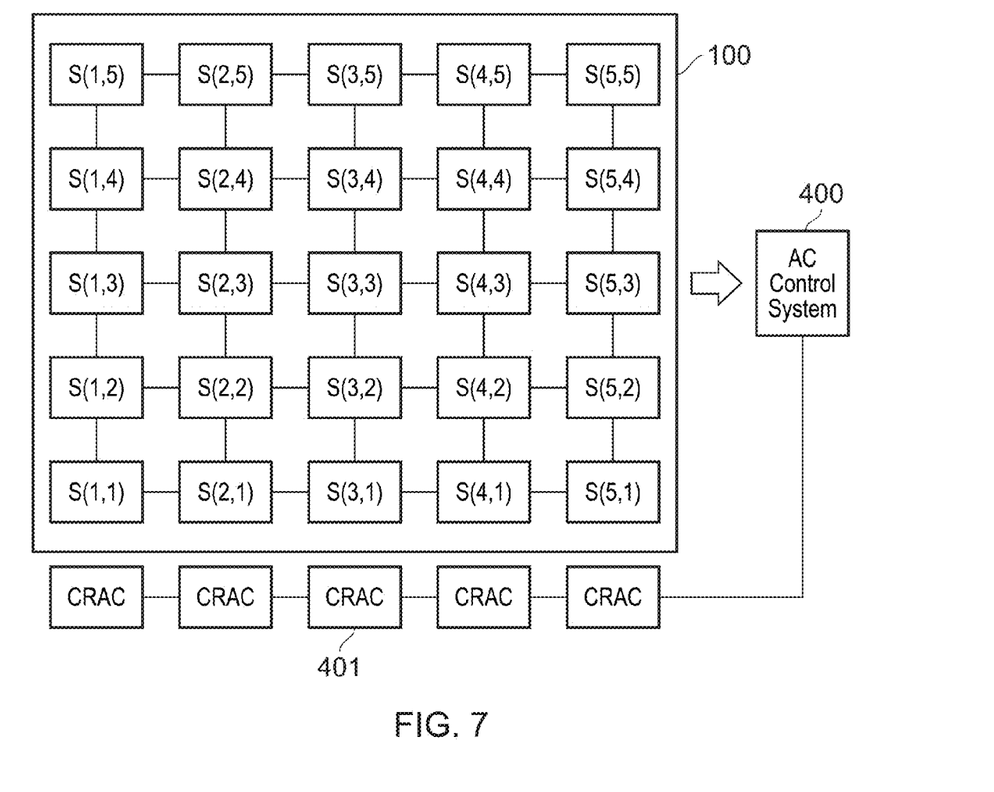
FIG. 7 illustrates a further embodiment including air cooling equipment.

FIG. 7 shows a further embodiment in which the server grid 100 interacts with the cooling system by sending information about the spatial distribution of the loads to an air conditioning control system 400; this control system adjusts the distribution of cooling resources (e.g. airflow supplied by CRAC units 410) in response to the distribution of loads on the data floor.

What is claimed is:

1. A method in a plurality of interconnected computing devices, the method comprising:
   each of the plurality of interconnected computing devices taking a turn to operate as a particular computing device among the plurality of interconnected computing devices;
   the method further comprising, at the turn of each of the plurality of interconnected computing devices to operate as the particular computing device:
   obtaining, from the particular computing device and from the or each of a group of one or more other computing devices from among the plurality of interconnected computing devices,
   load information representing the current capacity of the computing device from which the load information is obtained to perform computational load additional to its current computational load; and
   determining, in dependence upon the obtained load information, whether or not to redistribute computational load from the particular computing device to one of the group of computing devices;
   if it is determined to redistribute computational load, determining the redistribution including, based on the obtained load information, determining the computing device having the smallest capacity from among the computing devices of the group that have a non-zero current capacity, and selecting the determined computing device as a recipient computing device of the redistribution, and instructing the determined redistribution; wherein
   each of the plurality of interconnected computing devices has a designated position in the each of n dimensions, and for each computing device, the group is formed of the computing devices designated with the adjacent positions in the or each of the n dimensions, n is equal to 2 or 3, each of the n dimensions corresponds to a spatial dimension, and the designated position of each computing device in the n dimensions represents the spatial position of the computing device relative to the other computing devices.

2. A plurality of interconnected computing devices the plurality of interconnected computing devices being configured, in turn, to operate as a
   particular computing device among the plurality of interconnected computing devices, each one of the plurality of interconnected computing devices comprising:
   a load information obtaining unit stored in a memory and configured, when it is the turn of the respective one of the plurality of interconnected computing devices to operate as the particular computing device, to obtain, from the particular computing device and from the or each of a group of one or more other computing devices from among the plurality of interconnected computing devices, load information representing the current capacity of the computing device from which the load information is obtained to perform computational load additional to its current computation load; and
   a load redistribution determination unit stored in a memory and configured, when it is the turn of the respective one of the plurality of interconnected computing devices to operate as the particular computing device, in dependence upon the load information obtained in the same turn, to determine whether or not to redistribute computational load from the particular computing device to one of the group of computing devices and if it is determined to redistribute computational load, to determine the redistribution including, based on the obtained load information, determining the computing device having the smallest capacity from among the computing devices of the group that have a non-zero current capacity, to select the determined computing device as a recipient computing device of the redistribution, and to instruct the determined redistribution;
   wherein each of the plurality of interconnected computing devices has a designated position in the each of n dimensions, and for each computing device, the group is formed of the computing devices designated with the adjacent positions in the or each of the n dimensions, n is equal to 2 or 3, each of the n dimensions corresponds to a spatial dimension, and the designated position of each computing device in the n dimensions represents the spatial position of the computing device relative to the other computing devices.

3. A plurality of interconnected computing devices according to claim 2, wherein the load redistribution determination unit is configured to select an amount of computational load to redistribute in the instructed redistribution, the selected amount being equal to the current computational load of the particular computing device, unless the current capacity of the recipient computing device is less than the current computational load of the particular computing device, in which case the selected amount is equal to the current capacity of the recipient computing device.

4. A plurality of interconnected computing devices according to claim 2, wherein, if the load redistribution determination unit instructs the particular computing device to redistribute all of its current computational load, the particular computing device is configured, following completion of the instructed redistribution, to enter a sleep, hibernation or standby mode or to switch off.

5. A plurality of interconnected computing devices according to any of the preceding claims, wherein the group is formed of:
   computing devices within a predetermined maximum physical distance to the particular computing device; and/or
   computing devices physically adjacent to the particular computing device in one or more directions; and/or
   computing devices housed within a rack which also houses the particular computing device.

6. A plurality of interconnected computing devices according to claim 2, wherein the plurality of interconnected computing devices are servers and are housed within an enclosure.

7. A plurality of interconnected computing devices according to claim 2, wherein the order in which the plurality of interconnected computing devices take a respective turn to operate as the particular computing device is determined by the physical location of the computing devices.

8. A system including a plurality of interconnected computing devices according to claim 2, a cooling system, and a controller configured to control operation of the cooling system,
   wherein the plurality of interconnected computing devices are configured to transmit information representing the spatial distribution of the computational load to the controller.

9. A computer program stored on a computer readable non-transitory storage medium and which, when executed by each of a plurality of interconnected computing devices, causes the plurality of interconnected computing device to operate as the plurality of interconnected computing device according to claim 2.

* * * * *